United States Patent Office 3,394,188
Patented July 23, 1968

3,394,188
B-HOMO-19-NORANDROSTENES
John A. Edwards, Palo Alto, Calif., assignor to Syntex Corporation, Panama, Panama, a corporation of Panama
No Drawing. Filed Aug. 5, 1965, Ser. No. 477,599
20 Claims. (Cl. 260—586)

ABSTRACT OF THE DISCLOSURE

Novel B-homo-19-norandrost-4-en-3-one and B-homo-19-norandrost-5(10)-en-3-one steroids which are, inter alia, anabolic and progestational agents and processes for the preparation of such compounds.

This invention relates to novel cyclopentanopolyhydrophenanthrene derivatives and to processes for the preparation thereof.

More particularly, this invention relates to novel B-homo-19-nor-$\Delta^4$- and $\Delta^{5(10)}$-androsten-3-ones represented by the general formula:

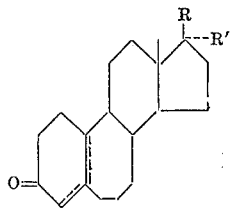

In the above formula R represents a hydroxyl group, an acyloxy group, a tetrahydrofuranyloxy group or a tetrahydropyranyloxy group, $R^1$ represents hydrogen, a lower alkyl (including cycloalkyl) group, such as methyl, ethyl, propyl, cyclopropyl, butyl, cyclobutyl, and the like, a lower alkenyl group, such as vinyl and the like, or a lower alkynyl (including halo-lower alkynyl) group, such as ethynyl, fluoroethynyl, chloroethynyl, brom o e t h y n y l, propynyl, trifluoroproynyl, butynyl, hexynyl, and the like; R and $R^1$ taken together can also represent a keto group, and the dotted lines indicate that there is one double bond at either the 4(5)- or the 5(10)-position.

The acyl and acyloxy groups referred to herein are preferably derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t - butylacetate, phenoxyacetate, cyclopentylpropionate, aminoacetate, and β-chloropropionate.

The novel B-homo steroids represented by the above formula wherein $R^1$ is other than alkynyl are anabolic agents with a favorable anabolic-androgenic ratio. They also have anti-estrogenic, antigonadotrophic and anti-fibrillatory properties. lower blood cholesterol levels, and suppress the output of the pituitary gland.

The novel B-homo steroids described above wherein $R^1$ represents a lower alkynyl group are progestational agents having antiandrogenic, anti-estrogenic, anti-gonadotrophic and diuretic properties. In addition, they can be used in fertility control, in the treatment of premenstrual tension, and in lowering blood cholesterol levels.

The novel B-homo-19-nor-$\Delta^{5(10)}$-androsten-3-ones of the present invention may be prepared by processes illustrated by the following equations:

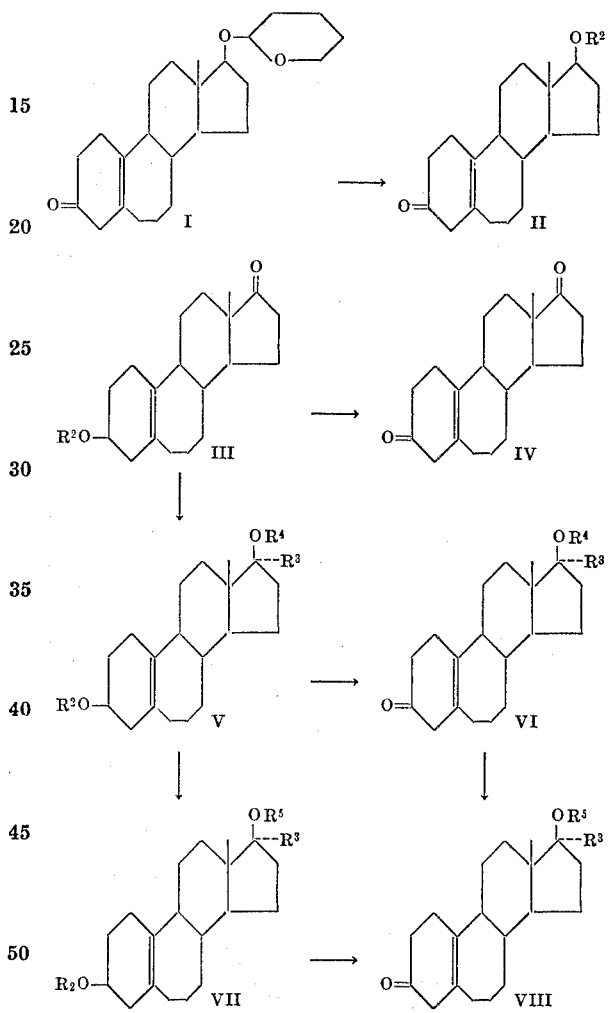

In the above formulas $R^2$ and $R^4$ represent hydrogen or an acyl group, $R^3$ represents a lower alkyl, lower alkenyl or lower alkynyl group of the type described hereinabove, and $R^5$ represents a tetrahydrofuranyl or tetrahydropyranyl group.

In practicing the processes outlined above, the starting material I, B - homo - 19 - nor-17β-tetrahydropyanyloxy-$\Delta^{5(10)}$-androsten-3-one, obtained as described in my copending U.S. patent application Ser. No. 477,319, filed Aug. 4, 1965, or the corresponding tetrahydrofuranyloxy derivative (obtained by etherifying the 17β-hydroxyl group of B - homo - 19-nor-$\Delta^{5(10)}$-androstene-3$\beta$,17$\beta$-diol 3-acetate, also described in said copending application, with dihydrofuran instead of dihydropyran, hydrolyzing the 3-acetate group to give the corresponding free 3$\beta$-ol, and finally oxidizing the 3$\beta$-hydroxyl group to give the corresponding 3-ketone, with these etherification, hydrolysis and oxidation reactions being carried out in the manner described in said copending application), is dissolved in aqueous lower alkanol, such as methanol, ethanol, or the like, and treated with oxalic acid at a temperature ranging from about room temperature to reflux temperature for from about 10 minutes to about 2 hours to remove the tetrahydropyranyl (or tetrahydrofuranyl) group, thus giving the corresponding 17$\beta$-hydroxy compound II, B - homo - 19-nor-$\Delta^{5(10)}$-androsten-17$\beta$-ol-3-one ($R^2$=hydrogen). The latter compound may be esterified in a conventional manner to obtain the corresponding 17-acylate, that is, B-homo-19-nor-$\Delta^{5(10)}$-androsten-17$\beta$-ol-3-one 17-acylate (II; $R^2$=acyl).

The starting material III, a B-homo-19-nor-$\Delta^{5(10)}$-androsten-3$\beta$-ol-17-one 3-acylate, (III; $R^2$=acyl), also obtained as described in my aforementioned copending U.S. patent application, is hydrolyzed as by refluxing it in aqueous methanoilc potassium hydroxide, to give the corresponding 3$\beta$-hydroxy steroid, B-homo-19-nor-$\Delta^{5(10)}$-androsten-3$\beta$-ol-17-one (III; $R^2$=hydrogen). The latter compound is then oxidized, using chromium trioxide in pyridine, or the like, preferably at room temperature overnight, to give the corresponding 3,17-diketo steroid, B-homo-19-nor-$\Delta^{5(10)}$-androstene-3,17-dione (IV).

The starting material III can also be reacted at reflux temperature in an inert organic solvent, preferably thiophen-free benzene or the like, under substantially anhydrous conditions for about 3 hours or longer, with a lower alkyl, alkenyl or alkynyl magnesium halide, such as methyl, vinyl or ethynyl magnesium bromide, or the like, to produce the corresponding 17$\alpha$-lower alkyl, -alkenyl or -alkynyl-17$\beta$-hydroxy derivative, B-homo-17$\alpha$-methyl (vinyl, or ethynyl)-19-nor-$\Delta^{5(10)}$-androstene-3$\beta$, 17$\beta$-diol [V; $R^2$=$R^4$=hydrogen, $R^3$=methyl (vinyl or ethynyl)].

Similarly, a lower alkyl, alkenyl or alkynyl lithium compound, such as ethyl lithium, vinyl lithium, ethynyl lithium, or the like, in absolute diethyl ether and under an inert nitrogen atmosphere, can be used to convert the starting material III by reaction at room temperature for 48 hours or longer, to the corresponding 17$\alpha$-lower alkyl, -lower alkenyl or -lower alkynyl-17$\beta$-hydroxy derivative. The 17-one, dissolved in anhydrous benzene containing potassium T-amylate, can also be reacted with gaseous acetylene under an inert nitrogen atmosphere for 36 hours or longer at room temperature to give the corresponding 17$\alpha$-ethynyl-17$\beta$-hydroxy derivative. Hydrogenation of this compound by known methods gives the corresponding 17$\alpha$-vinyl or 17$\alpha$-ethyl derivative.

17$\alpha$-Haloalkynyl substituents can be introduced by first slowly mixing a polyhaloalkylene of the general formula:

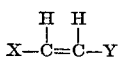

wherein X represents chloro or bromo and Y represents fluoro, chloro, bromo or fluoro-lower alkyl, e.g., trifluoromethyl, such as 1-chloro-2-fluoro-ethylene; 1,2-dichloroethylene; 1,2 - dibromoethylene; 1 - chloro-3,3,3-trifluoropropyl - 1 - ene, 1 - bromo - 3,3,3 - trifluoropropyl - 1-ene, or the like, in anhydrous diethyl ether under an inert nitrogen atmosphere at 0° C., with a solution of methyl lithium in anhydrous diethyl ether (prepared, for example, by adding lithium to methyl iodide in anhydrous diethyl ether solution under an inert nitrogen atmosphere at about 10° C.). This mixture is then held at room temperature, with stirring, for from about 90 minutes to about 2 hours, following which the 17-one is slowly added and the resulting reaction mixture is held at room temperature for from about 12 hours to about 18 hours to give the corresponding 17$\alpha$-haloalkynyl derivative. Where 1 - chloro - 2-fluoroethylene; 1,2-dichloroethylene; 1,2-dibromoethylene and 1-chloro-3,3,3-trifluoropropyl-1-ene, respectively, are employed, a 17$\alpha$-fluoroethynyl, 17$\alpha$-chloroethynyl, 17$\alpha$-bromoethynyl and 17$\alpha$-trifluoropropynyl, respectively, is obtained.

The 17$\alpha$ - aliphatic hydrocarbon - 3$\beta$,17$\beta$ - dihydroxy steroid (V; $R^2$=$R^4$=hydrogen, $R^3$=aliphatic hydrocarbon) can be esterifier using conventional techniques, e.g., reaction with a mixture of a hydrocarbon carboxylic acid and the corresponding anhydride in the presence of a strongly acidic catalyst, such as p-toluenesulfonic acid and the like, to give the corresponding 3,17-diacylate, B-homo - 17$\alpha$ - aliphatic hydrocarbon - 19-nor-$\Delta^{5(10)}$-androstene-3$\beta$,17$\beta$-diol 3,17-diacylate (V; $R^2$=$R^4$=acyl, $R^3$=aliphatic hydrocarbon).

The 3,17-diacylate may be then selectively hydrolyzed at the 3-position in known manner, e.g., by treating it with an aqueous 1% potassium hydroxide solution in methanol at about 0° C., thus giving the corresponding free 3$\beta$-hydroxyl compound, e.g., B-homo-17$\alpha$-aliphatic hydrocarbon - 19 - nor-$\Delta^{5(10)}$-androstene-3$\beta$,17$\beta$-diol 17-acylate ($V$=$R^2$=hydrogen, $R^4$=acyl, $R^3$=aliphatic hydrocarbon).

Oxidation of the thus-obtained 3$\beta$-hydroxy steroid, using chromium trioxide in pyridine, or the like, in the manner described hereinabove, produces the corresponding 3-ketone, B-homo-17$\alpha$-aliphatic hydrocarbon-19-nor-$\Delta^{5(10)}$-androsten-17$\beta$-ol-3-one 17-acylate (VI; $R^4$=acyl, $R^3$=aliphatic hydrocarbon).

Similarly, the 17$\alpha$-substituted-3$\beta$, 17$\beta$-dihydroxy steroid (V; $R^2$=$R^4$=hydrogen) can be oxidized with chromium trioxide in pyridine, or the like, in the manner described hereinabove, to give the corresponding 17$\alpha$-substituted-17$\beta$-ol-3-one, e.g., B-homo-17$\alpha$-aliphatic hydrocarbon-19-nor - $\Delta^{5(10)}$ - androsten - 17$\beta$-ol-3-one (VI; $R^4$=hydrogen, $R^3$=aliphatic hydrocarbon).

The 17$\alpha$-substituted-3$\beta$, 17$\beta$-dihydroxy steroid can also be selectively esterified at the 3-position by treatment with an acyl anhydride in pyridine in the manner described hereinabove, thus giving the corresponding 3$\beta$, 17$\beta$-diol 3-monoacylate, e.g., B-homo-17$\alpha$-aliphatic hydrocarbon-19-nor-$\Delta^{5(10)}$-androstene-3$\beta$, 17$\beta$-diol 3-acylate (V; $R^2$=acyl, $R^4$=hydrogen, $R^3$= aliphatic hydrocarbon).

By reacting the thus-obtained free 17$\beta$-ol with dihydrofuran or dihydropyran in benzene under substantially an hydrous conditions in the presence of a small amount of an acid catalyst, e.g., p-toluenesulfonic acid, boron trifluoride etherate, or the like, preferably at from about room temperature to about 50° C. for from about 1 to about 72 hours, the corresponding 17-tetrahydrofuranyl or -tetrahydropyranyl ether VII, e.g., B-homo-17$\alpha$-aliphatic hydrocarbon - 17$\beta$ - tetrahydropyranyloxy-19-nor-$\Delta^{5(10)}$-androsten-3$\beta$-ol 3-acylate (VII; $R^2$=acyl, $R^3$=aliphatic hydrocarbon, $R^5$=tetrahydropyranyl), is obtained.

Hydrolysis of the 3-acyl group in the thus-obtained 17-ether with aqueous methanolic potassium hydroxide, or the like, in the manner described hereinabove gives the corresponding free 3$\beta$-ol, B-homo-17$\alpha$-aliphatic hydrocarbon-17$\beta$-tetrahydropyranyloxy-19-nor-$\Delta^{5(10)}$-androstendrofuran or tetrahydropyran, $R^3$=aliphatic hydrocarbon), may be obtained directly.

By oxidizing the latter compound with chromium trioxide in pyridine, or the like, in the manner described hereinabove, the corresponding 3-ketone, e.g., B-homo-17$\alpha$-aliphatic hydrocarbon-17$\beta$-tetrahydropyranyloxy-19-nor-$\Delta^{5(10)}$-androsten-3-one (VIII; $R^3$=aliphatic hydrocarbon, $R^5$=tetrahydropyranyl), is obtained.

By reacting the 17$\alpha$-substituted-17$\beta$-hydroxy-3-one (VI; $R^4$=hydrogen, $R^3$=aliphatic hydrocarbon) with dihydrofuran or dihydropyran in the manner described hereinabove, the same 17$\alpha$-substituted-17$\beta$-tetrahydrofuranyloxy or -tetrahydropyranyloxy-3-one (VIII; $R^5$=tetrahydrofuran or tetrahydropyran, $R^3$=aliphatic hydrocarbon), may be obtained directly.

The novel B-homo-19-nor-$\Delta^4$-androsten-3-ones of the present invention are prepared by a process illustrated by the following equations:

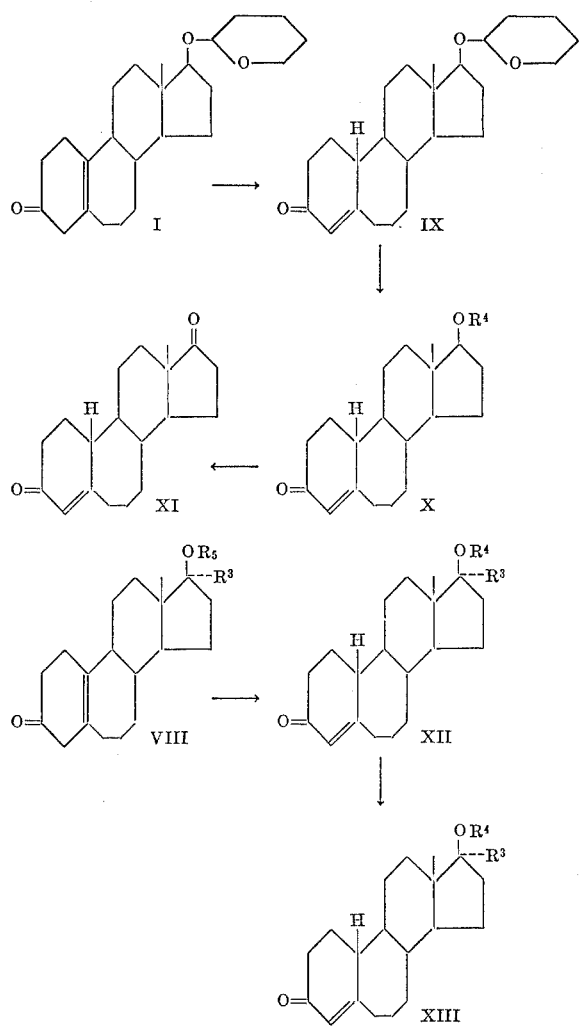

In these formulas $R^3$, $R^4$ and $R^5$ have the same meanings as set forth previously.

In carrying out the processes outlined above, the starting material I, B-homo-19-nor-17β-tetrahydropyranyloxy-$\Delta^{5(10)}$-androsten-3-one (or the corresponding 17β-tetrahydrofuranyloxy compound, prepared as described hereinabove), dissolved in a lower alkanol, such as methanol, ethanol, or the like, is refluxed with an equeous sodium hydroxide or potassium hydroxide solution of from about 0.01 N to about 0.1 N, for from about 1 hour to about 6 hours, to give the corresponding 19-nor-$\Delta^4$-steroid, B-homo-19-nor-17β-tetrahydropyranyloxy (or tetrahydrofuranyloxy)-$\Delta^4$-androsten-3-one (IX).

The latter compound, dissolved in aqueous lower alkanol, is then reacted with oxalic acid in the manner described hereinabove to give the corresponding free 17β-ol, B-homo-19-nor-$\Delta^4$-androsten-17β-ol-3-one (X; $R^4$=hydrogen), which upon esterification in a conventional manner is transformed into the corresponding ester, that is, B-homo-19-nor-$\Delta^4$-androsten-17β-ol-3-one 17-acylate (X; $R^4$=acyl).

Oxidation of the free 17β-ol, as with chromium trioxide in pyridine in the manner described hereinabove, gives the corresponding 17-keto steroid, B-homo-19-nor-$\Delta^4$-androstene-3,17-dione (XI).

In forming the 17α-substituted-19-nor-$\Delta^4$-steroids of the novel invention, the starting material VII, e.g., B-homo-17α-aliphatic hydrocarbon-17β-tetrahydropyranyloxy-$\Delta^{5(10)}$-androsten-3-one (VIII; $R^3$=aliphatic hydrocarbon, $R^5$=tetrahydropyranyl), dissolved in a lower alkanol, is refluxed with an aqueous sodium hydroxide solution in the manner previously described, thus giving the corresponding 19-nor-$\Delta^4$-steroid, e.g., B-homo-17α-aliphatic hydrocarbon-19-nor-17β - tetrahydropyranyloxy-$\Delta^4$-androsten-3-one (XII: $R^3$=aliphatic hydrocarbon, $R^5$=tetrahydropyranyl).

Reaction of the lattre compound with oxalic acid as described previously affords the corresponding free 17β-ol (XIII; $R^4$=hydrogen), and esterification of this free 17β-ol affords the corresponding esters (XIII: $R^4$=acyl).

In order that those skilled in the art can more fully understand the present invention, the following examples are set forth. These examples, are given solely for the purpose of illustrating the invention, and should not be considered as expressing limitations unless so set forth in the appended claims.

Example I

A solution of 1 gram of B-homo-19-nor-17β-tetrahydropyranyloxy$\Delta^{5(10)}$-androsten-3-one in 80 cc. of methanol was admixed with a solution of 1 gram of oxalic acid in 20 cc. of water, and the resulting reaction mixture was refluxed for 1 hour. Following this reaction period the reaction mixture was concentrated to about 20 cc. under vacuum, then poured into ice water. The resulting precipitate was collected by filtration, washed with water until neutral, then dried. Recrystallization of the dry precipitate from acetone/hexane gave B-homo-19-nor-$\Delta^{5(10)}$-androsten-17β-ol-3-one.

Example II

A mixture of 1 gram of B-homo-19-nor-$\Delta^{5(10)}$-androsten-17β-ol-3-one, 4 cc. of pyridine and 2 cc. of acetic anhydride was allowed to stand at room temperature overnight. Following this reaction period the reaction mixture was poured into ice water and the resulting precipitate collected by filtration, washed with water and dried. Crystallization from acetone/hexane gave B-homo-19-nor-$\Delta^{5(10)}$-androsten-17β-ol-3-one 17-acetate.

By repeating this procedure in every detail but one, namely, replacing acetic anhydride with propionic, cyclopentylpropionic, β-chloropropionic, butyric, caproic and enanthic anhydride, respectively, the corresponding 17-propionate, -cyclopentylpropionate, -β-chloropropionate, -butyrate, -caproate and -enanthate were obtained.

Example III

A solution of 1 gram of B-homo-19-nor-$\Delta^{5(10)}$-androsten-3β-ol-17-one 3-acetate in 50 cc. of methanol was refluxed for 3 hours with 500 mg. of potassium hydroxide dissolved in 1 cc. of water. Following this reaction period the reaction mixture was poured into ice water and the resulting precipitate collected by filtration, washed with water until neutral and then dried. Recrystallization from methylene dichloride/diethyl ether gave B-homo-19-nor-$\Delta^{5(10)}$-androsten-3β-ol-17-one.

Example IV

A solution of 6 grams of B-homo-19-nor-$\Delta^{5(10)}$-androsten-3β-ol-17-one in 120 cc. of pyridine was added to a mixture of 6 grams of chromium trioxide in 120 cc. of pyridine, and the resulting reaction mixture was then allowed to stand at room temperature overnight. Following this reaction period the reaction mixture was diluted with ethyl acetate and then filtered through Celite. The resulting filtrate was washed thoroughly with water, then dried over anhydrous sodium sulfate and evaporated to dryness. Crystallization from acetone/hexane gave B-homo-19-nor-$\Delta^{5(10)}$-androstene-3,17-dione.

Example V

A solution of 5 grams of B-homo-19-nor-$\Delta^{5(10)}$-androsten-3β-ol-17-one 3-acetate in 250 cc. of thiophene-free benzene was admixed with 27.5 cc. of a 4 N solution of methylmagnesium bromide in diethyl ether, and the resulting reaction mixture was refluxed, excluding moisture, for 3 hours. Following this reaction period the reaction mixture was cooled to room temperature, then cautiously treated with an excess of an aqueous ammonium chloride solution, and then extracted with ethyl acetate. The resulting extract was washed with water, then dried over anhydrous sodium sulfate and evaporated to dryness. Recrystallization from methylene dichloride/hexane gave B-homo-17α-methyl-19-nor-$\Delta^{5(10)}$-androstene-3β,17β-diol.

Example VI

A solution of 1 gram of B-homo-19-nor-$\Delta^{5(10)}$-androsten-3β-ol-17-one in 30 cc. of anhydrous, thiophene-free benzene was added, under an inert nitrogen atmosphere, to a solution prepared by dissolving 1.4 grams of potassium in 30 cc. of t-amyl alcohol, and a slow current of purified acetylene was then passed through the thus-prepared solution for 40 hours. Following this reaction period the reaction mixture was diluted with water and then extracted with benzene. The resulting extract was then washed with water until neutral, then dried over anhydrous sodium sulfate. Next, evaporation of the benzene and chromatography of the residue on alkaline alumina gave in the hexane/benzene (2:3 by volume, respectively) fractions a product which, upon recrystallization from acetone/hexane, gave pure B-homo-17α-ethynyl-19-nor-$\Delta^{5(10)}$-androstene-3β,17β-diol.

Example VII

A solution of 1 gram of B-homo-17α-ethynyl-19-nor-$\Delta^{5(10)}$-androstene-3β,17β-diol in 40 cc. of pyridine containing 400 mg. of pre-hydrogenated 2% palladium-on-calcium carbonate hydrogenation catalyst was hydrogenated at room temperature and atmospheric pressure until 1.1 molar equivalents of hydrogen had been absorbed. At this point the reaction was stopped and the catalyst was removed by filtration through Celite, then washed with ethyl acetate. The washings were then added to the filtrate and the combined solution was evaporated to dryness under vacuum. The resulting residue was dissolved in ethyl acetate, and the thus-obtained solution was washed with dilute hydrochloric acid and then with water until neutral, dried over anhydrous sodium sulfate and evaporated to dryness. Recrystallization from acetone gave B-homo-19-nor-17α-vinyl-$\Delta^{5(10)}$-androstene-3β,17β-diol.

Example VIII

A solution of 8.5 grams of 1-chloro-2-fluoroethylene in 50 cc. of anhydrous diethyl ether was added dropwise, with stirring, at 0° C. over a half hour period, to 15 cc. of a 1.4 N solution of methyl lithium in anhydrous diethyl ether, maintained under an inert nitrogen atmosphere, and this mixture was then held at room temperature, with stirring, for an additional 90 minutes.

Next, a solution of 0.5 gram of B-homo-19-nor$\Delta^{5(10)}$-androsten-3β-ol-17-one in 20 cc. of anhydrous diethyl ether was added dropwise, with stirring, over a 15 minute period, following which the resulting reaction mixture was held at room temperature, with stirring, for 18 hours. Following this reaction period the reaction mixture was poured into ice water and then extracted with diethyl ether. The ether extract was then washed with water, dried over anhydrous sodium sulfate and concentrated under vacuum. Chromatography of the residue on basic alumina, using petroleum ether/diethyl ether (8:2, respectively, by volume) as the eluant, followed by crystallization from methanol, gave B-homo-17α-fluoroethynyl-19-nor-$\Delta^{5(10)}$-androstene-3β-17β-diol.

By repeating this procedure in every detail but one, namely replacing 1-chloro-2-fluoroethylene with 1,2-dichloroethylene; 1,2-dibromoethylene and 1-chloro-3,3,3-trifluoropropyl-1-ene, respectively, the corresponding 17α-haloalkynyl derivatives, namely, B-homo-17α-chloroethynyl-19-nor-$\Delta^{5(10)}$-androstene - 3β,17β - diol; B-homo-17α-bromoethynyl-19-nor-$\Delta^{5(10)}$-androstene-3β,17β - diol and B-homo-17α-trifluoropropynyl - 19-nor-$\Delta^{5(10)}$-androstene-3β,17β-diol, respectively, were obtained.

Example IX

A mixture of 1 gram of B-homo-17α-methyl-19-nor-$\Delta^{5(10)}$-androstene-3β,17β-diol, 1 gram of p-toluenesulfonic acid monohydrate, 50 cc. of acetic acid and 25 cc. of acetic anhydride was allowed to stand at room temperature for 24 hours. Following this reaction period the reaction mixture was poured into water and stirred until the excess acetic anhydride had hydrolyzed. Next, the product was isolated by extraction with methylene dichloride, and the extract was washed with water until neutral, then dried over anhydrous sodium sulfate and evaporated to dryness. Crystallization of the residue from acetone/diethyl ether gave B-homo-17α-methyl-19-nor-$\Delta^{5(10)}$-androstene-3β,17β-diol 3,17-diacetate.

By repeating this procedure in every detail but one, namely, replacing B-homo - 17α - methyl-19-nor-$\Delta^{5(10)}$-androstene-3β,17β-diol with: B-homo - 19 - nor - 17α-vinyl-$\Delta^{5(10)}$-androstene-3β,17β-diol; B-homo-17α-ethynyl-19-nor-$\Delta^{5(10)}$-androstene-3β,17β-diol; B-homo-17α-fluoroethynyl-19-nor-$\Delta^{5(10)}$-androstene-3β,17b - diol; B-homo-17α-chloroethynyl-19-nor-$\Delta^{5(10)}$-androstene - 3β,17β - diol; B - homo - 17α - bromoethynyl-19-nor-$\Delta^{5(10)}$-androstene-3β,17β - diol and B-homo-17α-trifluoropropynyl-19-nor-$\Delta^{5(10)}$-androstene - 3β,17β-diol, respectively, the corresponding 3,17-diacetates were obtained.

Similarly, by replacing the acetic acid and acetic anhydride with mixtures of propionic acid and propionic anhydride, cyclopentylpropionic acid and cyclopentylpropionic anhydride, β-chloropropionic acid and β-chloropropionic anhydride, butyric acid and butyric anhydride, caproic acid and caproic anhydride, and enanthic acid and enanthic anhydride, and using in turn each of the seven 17α-substituted-3β,17β-diols mentioned hereinabove, the corresponding 3,17-dipropionates, -dicyclopentylpropionates, -di-β-chloropropionates, -dibutyrates, -dicaproates and -dienanthates were obtained.

Example X

A solution of 1 gram of B-homo-17α-methyl-19-nor-$\Delta^{5(10)}$-androstene-3β,17β-diol 3,17-diacetate in 40 cc. of methanol was cooled to 0° C. and then admixed with a similarly cooled solution of 500 mg. of potassium hydroxide in 10 cc. of water, and the resulting reaction mixture was held at 0° C. for 24 hours. Following this reaction period the reaction mixture was poured into a large volume of ice water, and the resulting precipitate was collected by filtration, washed with water until neutral and dried. Recrystallization from methylene dichloride/diethyl ether gave B-homo-17α-methyl-19-nor-$\Delta^{5(10)}$-androstene-3β,17β-diol 17-acetate.

This procedure was then repeated in every detail but one, namely, B - homo-17α-methyl-19-nor-$\Delta^{5(10)}$-androstene-3β,17β-diol 3,17-diacetate was replaced by: B-homo-19-nor-17α-vinyl-$\Delta^{5(10)}$-androstene - 3β,17β - diol 3,17-diacetate; B - homo-17α-ethynyl-19-nor-$\Delta^{5(10)}$-androstene-3β,17β-diol 3,17-diacetate; B-homo-17α-fluoroethynyl-19-nor-$\Delta^{5(10)}$-androstene-3β,17β-diol 3,17-diacetate; B-homo-17α-chloroethynyl-19-nor-$\Delta^{5(10)}$-androstene-3β,17β - diol 3,17 - diacetate; B-homo-17α-bromoethynyl-19-nor-$\Delta^{5(10)}$-androstene-3β,17β-diol 3,17 - diacetate; B-homo-17α-trifluoropropynyl-19-nor-$\Delta^{5(10)}$-androstene-3β,17β-diol 3,17-diacetate; B-homo - 17α-methyl-19-nor-$\Delta^{5(10)}$-androstene-3β,17β-diol 3,17-dipropionate; B-homo-19-nor-17α-vinyl-$\Delta^{5(10)}$-androstene - 3β,17β-diol 3,17-dicyclopentyl-propionate; B-homo - 17α - ethynyl - 19 - nor-$\Delta^{5(10)}$-androstene-3β,17β-diol 3,17-di-β-chloropropionate; B-homo-17α-fluoroethynyl - 19 - nor-$\Delta^{5(10)}$-androstene-3β,17β-diol 3,17-dibutyrate; B-homo-17α-chloroethynyl-19-nor-$\Delta^{5(10)}$-androstene-3β,17β-diol 3,17-dicaproate; B-homo - 17α - bromoethynyl-19-nor-$\Delta^{5(10)}$-androstene-3β,17β-diol 3,17-dienanthate and B-homo-17α-trifluoropropynyl-19-nor-$\Delta^{5(10)}$-androstene-3β,17β-diol 3,17-dipropionate, respectively. In each case, the corresponding 17-monoester was obtained.

Example XI

B-homo-17α-methyl-19-nor-$\Delta^{5(10)}$-androstene-3β,17β-diol 17-acetate was oxidized, using chromium trioxide in pyridine in the manner described in Example IV hereinabove, to give B - homo - 17α - methyl-19-nor-$\Delta^{5(10)}$-androsten-17β-ol-3 one 17-acetate.

Similarly, by replacing B-homo-17α-methyl-19-nor-$\Delta^{5(10)}$-androstene-3β,17β-diol 17-acetate with the remaining 17-monoesters prepared as described in Example X hereinabove, the corresponding 3-ones, namely, B-homo-19-nor-17α-vinyl-$\Delta^{5(10)}$-androsten-17β-ol-3-one 17-acetate; B-homo - 17α - ethynyl-19-nor-$\Delta^{5(10)}$-androsten-17β-ol-3-one 17-acetate; B-homo-17α-fluoroethynyl-19-nor-$\Delta^{5(10)}$-androsten-17β-ol-3-one 17-acetate; B-homo-17α-chloroethynyl-19-nor-$\Delta^{5(10)}$-androsten-17β-ol-3-one 17 - acetate; B-homo-17α-bromoethynyl - 19 - nor-$\Delta^{5(10)}$-androsten-17β-ol-3-one 17-acetate; B-homo - 17α - trifluoropropynyl-19-nor-$\Delta^{5(10)}$androsten-17β-ol-3-one 17-acetate; B-homo-17α-methyl - 19 - nor-$\Delta^{5(10)}$-androsten - 17β-ol-3-one 17-propionate; B - homo-19-nor-17α-vinyl-$\Delta^{5(10)}$-androsten-17β-ol-3-one 17 - cyclopentylpropionate; B-homo-17α-ethynyl-19 - nor-$\Delta^{5(10)}$-androsten - 17β-ol-3-one 17-β-chloropropionate; B-homo - 17α - fluoroethynyl-19-nor-$\Delta^{5(10)}$-androsten-17β-ol-3-one 17 - butyrate; B-homo-17α-chloroethynyl-19-nor-$\Delta^{5(10)}$-androsten-17β-ol-3-one 17-caproate; B-homo-17α - bromoethynyl-19-nor-$\Delta^{5(10)}$-androsten-17β-ol-3-one 17-enanthate and B-homo-17α-trifluoropropynyl-19-nor-$\Delta^{5(10)}$-androsten-17β-ol-3-one 17-propionate, respectively, were obtained.

Example XII

B - homo - 17α-methyl-19-nor-$\Delta^{5(10)}$-androstene-3β,17β-diol was oxidized, using chromium trioxide in pyridine in the manner described in Example IV hereinabove, to give B - homo - 17α-methyl-19-nor-$\Delta^{5(10)}$-androsten-17β-ol-3-one.

By repeating this procedure in every detail but one, namely, replacing B - homo - 17α - methyl-19-nor-$\Delta^{5(10)}$-androstene-3β,17β-diol with the remaining 3β,17β-diols prepared as described in Examples VI, VII and VIII hereinabove, the corresponding 3-ones, namely, B-homo-19-nor-17α-vinyl-$\Delta^{5(10)}$-androsten-17β-ol-3-one; B-homo-17α-ethynyl - 19 - nor-$\Delta^{5(10)}$-androsten-17β-ol-3-one; B-homo-17α - fluoroethynyl - 19-nor-$\Delta^{5(10)}$-androsten-17β-ol-3-one; B - homo - 17α - chloroethynyl-19-nor-$\Delta^{5(10)}$-androsten-17β - ol - 3-one; B-homo-17α-bromoethynyl-19-nor-$\Delta^{5(10)}$-androsten-17β-ol-3-one and B - homo - 17α - trifluoropropynyl-19-nor-$\Delta^{5(10)}$-androsten-17β-ol-3 - one, respectively, were obtained.

Example XIII

B - homo-17α-methyl-19-nor-$\Delta^{5(10)}$-androstene - 3β,17β-diol was esterified with acetic anhydride in pyridine in the manner described in Example II hereinabove to give B-homo - 17α - methyl - 19-nor-$\Delta^{5(10)}$-androstene-3β,17β-diol 3-acetate.

This procedure was then repeated in every detail but one, namely, B-homo - 17α - methyl-19-nor-$\Delta^{5(10)}$-androstene-3β,17β-diol was replaced by the remaining 3β,17β-diols prepared as described in Examples VI, VII and VIII hereinabove. In each case, the corresponding 3-acetate, namely, B - homo - 19-nor-17α-vinyl-$\Delta^{5(10)}$-androstene-3β,17β - diol 3-acetate; B-homo-17α-ethynyl-19-nor-$\Delta^{5(10)}$-androstene - 3β,17β - diol 3-acetate; B-homo-17α-fluoroethynyl - 19 - nor-$\Delta^{5(10)}$-androstene-3β,17β-diol 3-acetate; B - homo - 17α - chloroethynyl-19-nor-$\Delta^{5(10)}$-androstene-3β,17β-diol 3-acetate; B-homo-17α-bromoethynyl-19-nor-$\Delta^{5(10)}$-androstene-3β,17β-diol 3-acetate and B-homo-17α-trifluoropropynyl - 19-nor-$\Delta^{5(10)}$-androstene-3β,17β-diol 3-acetate, respectively, was obtained.

Example XIV

To a solution of 1 gram of B-homo-17α-methyl-19-nor-$\Delta^{5(10)}$-androstene-3β,17β-diol 3-acetate in 25 cc. of benzene there was added 4 cc. of dihydropyran. Next, approximately 5 cc. of the mixture of benzene and dihydropyran was distilled off to remove moisture, and the remaining mixture was then cooled to room temperature. To the cooled mixture there was then added 0.1 gram of p-toluenesulfonic acid, and the resulting reaction mixture was held at room temperature for 72 hours. Following this reaction period the reaction mixture was washed with an aqueous 5% sodium carbonate solution and then with water until neutral, then dried over anhydrous sodium sulfate and evaporated to dryness. The dry residue was chromatographed by passing it, dissolved in hexane, through a column of neutral alumina, thus giving B-homo-17α - methyl - 17β - tetrahydropyranyloxy-19-nor-$\Delta^{5(10)}$-androstene-3β-ol 3-acetate.

By repeating this procedure in every detail but one, namely, replacing B - homo - 17α-methyl-19-nor-$\Delta^{5(10)}$-androstene-3β,17β-diol 3-acetate with the remaining 3-acetates prepared as described in Example XIII hereinabove, the corresponding 17β-tetrahydropyranyloxy derivatives, namely, B-homo-19-nor-17β-tetrahydropyranyloxy - 17α - vinyl-$\Delta^{5(10)}$-androsten-3β-ol 3-acetate; B-homo-17α - ethynyl - 17β - tetrahydropyranyloxy-19-nor-$\Delta^{5(10)}$-androsten - 3β - ol 3-acetate; B-homo-17α-fluoroethynyl-17β - tetrahydropyranyloxy - 19 - nor-$\Delta^{5(10)}$-androsten-3β-ol 3 - acetate; B - homo-17α-chloroethynyl-17β-tetrahydropyranyloxy - 19 - nor - $\Delta^{5(10)}$-androsten-3β-ol 3-acetate; B - homo - 17α - bromoethynyl-17β-tetrahydropyranyloxy-19 - nor - $\Delta^{5(10)}$-androsten-3β-ol 3-acetate and B-homo-17α - trifluoropropynyl - 17β - tetrahydropyranyloxy-19-nor-$\Delta^{5(10)}$-androsten-3β-ol 3-acetate, respectively, were obtained.

Similarly, by replacing dihydropyran with dihydrofuran, the corresponding tetrahydrofuranyloxy ethers were obtained.

Example XV

B - homo - 17α - methyl - 17β-tetrahydropyranyloxy-19 - nor - $\Delta^{5(10)}$-androsten-3β-ol 3-acetate was selectively hydrolyzed in the manner described in Example III hereinabove to give the corresponding free 3β-ol, B-homo-17α-methyl - 17β - tetrahydropyranyloxy-19-nor-$\Delta^{5(10)}$-androsten-3β-ol.

This procedure was then repeated in every detail but one, namely, B - homo-17α-methyl-17β-tetrahydropyranyloxy - 19 - nor - $\Delta^{5(10)}$-androsten-3β-ol 3-acetate was replaced by the remaining 17β-tetrahydropyranyloxy-3β-acetoxy steroids prepared as described in Example XIV hereinabove. In each case, the corresponding free 3β-ol, namely, B - homo - 19-nor-17β-tetrahydropyranyloxy-17α-vinyl - $\Delta^{5(10)}$ - androsten-3β-ol; B-homo-17α-ethynyl-17β-tetrahydropyranyloxy - 19 - nor - $\Delta^{5(10)}$-androsten-3β-ol; B - homo - 17α - fluoroethynyl-17β-tetrahydropyranyloxy-19 - nor - $\Delta^{5(10)}$ - androsten-3β-ol; B-homo-17α-chloroethynyl - 17β - tetrahydropyranyloxy-19-nor-$\Delta^{5(10)}$-androsten - 3β - ol; B - homo-17α-bromoethynyl-17β-tetrahydropyranyloxy - 19 - nor - $\Delta^{5(10)}$-androsten-3β-ol and B-homo - 17α - trifluoropropynyl - 17β-tetrahydropyranyloxy-19-nor-$\Delta^{5(10)}$-androsten-3β-ol, respectively, was obtained.

Similarly, by hydrolyzing the 3β-acetoxy group in the 17β-tetrahydrofuranyloxy derivatives prepared as described in Example XIV hereinabove, the corresponding free 3β-ols were obtained.

Example XVI

The free 3β-hydroxy group in B-homo-17α-methyl-17β-tetrahydropyranyloxy - 19 - nor - $\Delta^{5(10)}$-androsten-3β-ol was oxidized, using chromium trioxide in pyridine in the manner described in Example IV hereinabove, thus giving B - homo - 17α-methyl-17β-tetrahydropyranyloxy-19-nor-$\Delta^{5(10)}$-androsten-3-one.

By repeating this procedure in every detail but one, namely, replacing B - homo - 17α-methyl-17β-tetrahydropyranyloxy - 19 - nor - $\Delta^{5(10)}$-androsten-3β-ol with the remaining 17β-tetrahydropyranyloxy-3β-ols prepared as described in Example XV hereinabove, the corresponding 3-ones, namely, B - homo - 19-nor-17β-tetrahydropyranyloxy - 17α -vinyl - $\Delta^{5(10)}$-androsten-3-one; B-homo-17α-ethynyl - 17β - tetrahydropyranyloxy - 19 - nor - $\Delta^{5(10)}$-androsten - 3 - one; B-homo-17α-fluoroethynyl-17β-tetrahydropyranyloxy - 19 - nor - $\Delta^{5(10)}$ - androsten-3-one; B-homo - 17α - chloroethynyl - 17β-tetrahydropyranyloxy-19 - nor - $\Delta^{5(10)}$ - androsten-3-one; B-homo-17α-bromoethynyl - 17β - tetrahydropyranyloxy-19-nor-$\Delta^{5(10)}$-androsten - 3 - one and B-homo-17α-trifluoropropynyl-17β-tetrahydropyranyloxy - 19 - nor - $\Delta^{5(10)}$-androsten-3-one, respectively, were obtained.

Similarly, by oxidizing the free 3β-hydroxy group in the 17β - tetrahydrofuranyloxy derivatives obtained as described in Example XV hereinabove, the corresponding 3-ones were obtained.

Example XVII

B-homo - 17α - methyl-19-nor-$\Delta^{5(10)}$-androsten-17β-ol-3-one was etherified with dihydropyran in the manner described in Example XIV hereinabove to give B-homo-17α - methyl - 17β - tetrahydropyranyloxy-19-nor-$\Delta^{5(10)}$-androsten-3-one, identical to that prepared as described in Example XVI hereinabove.

This procedure was then repeated in every detail but one, namely, B homo - 17α - methyl-19-nor-$\Delta^{5(10)}$-androsten-17β-ol-3-one was replaced by the remaining 17β-ol-3-ones prepared as described in Example XII hereinabove. In each case the corresponding 17β-tetrahydropyranyloxy derivative was obtained.

Similarly, by replacing dihydropyran with dihydrofuran, and using each of the 17β-ol-3-ones prepared as described in Example XII hereinabove, the corresponding 17β-tetrahydrofuranyloxy derivatives were obtained.

Example XVIII

A solution of 1 gram of B-homo-17β-tetrahydropyranyloxy-19-nor-$\Delta^{5(10)}$-androsten-3-one in 10 cc. of methanol was mixed with 10 cc. of an aqueous 0.1 N solution of potassium hydroxide, and the resulting reaction mixture, maintained under an inert nitrogen atmosphere, was refluxed for 1 hour. Following this reaction period the reaction mixture was poured into ice water, and the resulting precipitate collected by filtration, washed with water until neutral and then dried. Recrystallization from methylene dichloride/diethyl ether gave B-homo-17β-tetrahydropyranyloxy-19-nor-$\Delta^4$-androsten-3-one.

By repeating this procedure in every detail but one, namely, replacing B-homo-17β-tetrahydropyranyloxy-19-nor-$\Delta^{5(10)}$-androsten-3-one with: B - homo-17α-methyl-17β - tetrahydropyranyloxy-19-nor-$\Delta^{5(10)}$-androsten-3-one; B-homo-19-nor - 17β - tetrahydropyranyloxy - 17α - vinyl-$\Delta^{5(10)}$-androsten-3-one; B-homo-17α-ethynyl-17β-tetrahydropyranyloxy-19-nor-$\Delta^{5(10)}$-androsten - 3 - one; B-homo-17α - fluoroethynyl - 17β - tetrahydropyranyloxy-19-nor-$\Delta^{5(10)}$-androsten-3-one; B - homo-17α-chloroethynyl-17β-tetrahydropyranyloxy - 19 - nor - $\Delta^{5(10)}$-androsten-3-one; B-homo - 17α - bromoethynyl - 17β - tetrahydropyranyloxy-19-nor-$\Delta^{5(10)}$-androsten-3-one and B-homo-17α-trifluoropropynyl - 17β - tetrahydropyranyloxy - 19 - nor-$\Delta^{5(10)}$-androsten-3-one, respectively, the corresponding $\Delta^4$-steroids, namely, B-homo-17α--methyl-17β-tetrahydropyranyloxy-19-nor-$\Delta^4$-androsten-3-one; B - homo-19-nor-17β - tetrahydropyranyloxy - 17α - vinyl-$\Delta^4$-androsten-3-one; B - homo-17α-ethynyl-17β-tetrahydropyranyloxy-19-nor-$\Delta^4$-androsten-3-one; B - homo-17α-fluoroethynyl-17β-tetrahydropyranyloxy - 19 - nor - $\Delta^4$ - androsten - 3 - one; B-homo - 17α - chloroethynyl - 17β - tetrahydropyranyloxy-19-nor-$\Delta^4$-androsten-3-one; B - homo - 17α - bromoethynyl - 17β-tetrahydropyranyloxy--19-nor-$\Delta^4$-androsten-3-one and B-homo-17α-trifluoropropynyl-17β-tetrahydropyranyloxy-19-nor-$\Delta^4$-androsten-3-one, respectively, were obtained.

Similarly, by replacing the eight 17β-tetrahydropyranyloxy-$\Delta^{5(10)}$-steroid starting materials mentioned above with the corresponding 17β-tetrahydrofuranyloxy derivatives, the corresponding 17β-tetrahydrofuranyloxy-$\Delta^4$-compounds were obtained.

Example XIX

B - homo - 17β - tetrahydropyranyloxy-19-nor-$\Delta^4$-androsten-3-one was reacted with oxalic acid in aqueous methanol in the manner described in Example I hereinabove to give B-homo-19-nor-$\Delta^4$-androsten-17β-ol-3-one.

By repeating this procedure in every detail but one, namely, replacing B-homo-17β-tetrahydropyranyloxy-19-nor-$\Delta^4$-androsten-3-one with the remaining 17β-tetrahydropyranyloxy-3-ones prepared as described in Example XVIII hereinabove, the corresponding free 17β-ols, namely, B-homo-17α-methyl-19-nor-$\Delta^4$-androsten-17β-ol-3-one; B - homo-19-nor-17α-vinyl-$\Delta^4$-androsten-17β-ol-3-one; B-homo - 17α - ethynyl-19-nor-$\Delta^4$-androsten-17β-ol-3-one; B - homo-17α-fluoroethynyl-19-nor-$\Delta^4$-androsten-17β-ol-3-one; B - homo - 17α - chloroethynyl-19-nor-$\Delta^4$-androsten-17β-ol-3-one; B - homo-17α-bromoethynyl-19-nor-$\Delta^4$-androsten-17β-ol-3-one and B-homo-17α-trifluoropropynyl-19-nor-$\Delta^4$-androsten-17β-ol-3-one, respectively, were obtained.

Example XX

B-homo - 19 - nor-$\Delta^4$-androsten-17β-ol-3-one was oxidized, using chromium trioxide in pyridine in the manner described in Example IV hereinabove, to give B-homo-19-$\Delta^4$-androstene-3,17-dione.

Example XXI

B-homo-19-nor-$\beta^4$-androsten-17β-ol-3-one was esterified, using acetic anhydride in pyridine in the manner described in Example II hereinabove, to give B-homo-19-nor-$\Delta^4$-androsten-17β-ol-3-one 17-acetate.

By repeating this procedure in every detail but one, namely, replacing acetic anhydride with propionic, cyclopentylpropionic, β-chloropropionic, butyric, caproic and enanthic anhydride, respectively, the corresponding 17-propionate, -cyclopentylpropionate, -β-chloropropionate, -butyrate, -caproate and -enanthate were obtained.

Example XXII

B - homo-17α-methyl-19-nor-$\Delta^4$-androsten-17β-ol-3-one was esterified, using a mixture of acetic acid and acetic anhydride in the presence of p-toluenesulfonic acid in the manner described in Example IX hereinabove, to give B-homo-17α-methyl-19-nor-$\Delta^4$-androsten-17β-ol-3-one 17-acetate.

By repeating this procedure in every detail but one, namely, replacing B-homo-17α-methyl-19-nor-$\Delta^4$-androsten-17β-ol-3-one with the remaining free 17β-ols prepared as described in Example XIX hereinabove, the corresponding 17-acetates were prepared.

Similarly, by replacing the acetic acid and acetic anhydride with mixtures of propionic acid and propionic anhydride, cyclopentylpropionic acid and cyclopentylpropionic anhydride, β-chloropropionic acid and β-chloropropionic anhydride, butyric acid and butyric anhydride, caproic acid and caproic anhydride, and enanthic acid and enanthic anhydride, and using in turn each of the free 17β-ols prepared as described in Example XIX hereinabove, the corresponding 17-propionates, -cyclopentylpropionates, -β- chloropropionates, -butyrates, -caproates and -enanthates were obtained.

It will be obvious to those skilled in the art that other changes and variations can be made in carrying out the present invention without departing from the spirit and scope thereof as defined in the appended claims.

I claim:
1. A compound represented by the general formula:

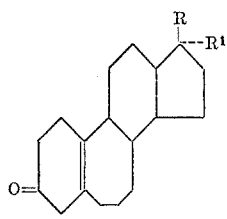

wherein R is selected from the group consisting of a hydroxyl group, a hydrocarbon carboxylic acyloxy group containing less than 12 carbon atoms, a tetrahydrofuranyloxy group and a tetrahydropyranyloxy group; R' is selected from the group consisting of hydrogen, a lower alkyl group, a lower alkenyl group and a lower alkynyl group, and R and R' taken together represent a keto group.

2. B-homo-19-nor-$\Delta^{5(10)}$-androstene-3,17-dione.
3. B-homo-19-nor-$\Delta^{5(10)}$-androsten-17β-ol-3-one.
4. B-homo - 17α-methyl-19-nor-$\Delta^{5(10)}$-androsten-17β-ol-3-one.
5. B-homo-19-nor-17α-vinyl-$\Delta^{5(10)}$-androsten - 17β - ol-3-one.
6. B - homo - 17α - ethynyl-19-nor-$\Delta^{5(10)}$-androsten-17β-ol-3-one.
7. B-homo - 17α - fluoroethynyl - 19 - nor-$\Delta^{5(10)}$-androsten-17β-ol-3-one.
8. B-homo-17α - chloroethynyl-19-nor - $\Delta^{5(10)}$ - androsten-17β-ol-3-one.
9. B-homo-17α-bromoethynyl-19-nor-$\Delta^{5(10)}$-androstene-17β-ol-3-one.
10. B-homo - 17α-trifluoropropinyl-19-nor-$\Delta^{5(10)}$-androstene-17β-ol-3-one.

11. A compound represented by the general formula:

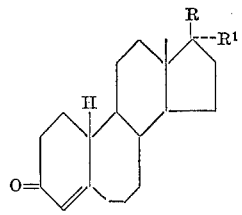

wherein R is selected from the group consisting of a hydroxyl group, a hydrocarbon carboxylic acyloxy group containing less than 12 carbon atoms, a tetrahydrofuranyloxy group and a tetrahydropyranyloxy group; R' is selected from the group consisting of hydrogen, a lower alkyl group, a lower alkenyl group and a lower alkynyl group, and R and R' taken together represent a keto group.

12. B-homo-19-nor-$\Delta^{4}$-androstene-3,17-dione.
13. B-homo-19-nor-$\Delta^{4}$-androsten-17β-ol-3-one.
14. B-homo-17α-methyl-19-nor-$\Delta^{4}$-androsten - 17β - ol-3-one.
15. B-homo - 19 - nor-17α-vinyl-$\Delta^{4}$-androsten-17β-ol-3-one.
16. B-homo-17α-ethynyl - 19-nor-$\Delta^{4}$-androsten-17β-ol-3-one.
17. B-homo-17α-fluoroethynyl-19-nor-$\Delta^{4}$-androsten-17β-ol-3-one.
18. B-homo - 17α-chloroethynyl-19-nor-$\Delta^{4}$-androstene-17β-ol-3-one.
19. B-homo-17α-bromoethynyl - 19-nor-$\Delta^{4}$-androstene-17β-ol-3-one.
20. B - homo - 17α - trifluoropropinyl-19-nor-$\Delta^{4}$-androstene-17β-ol-3-one.

References Cited
UNITED STATES PATENTS 3,234,269   2/1966   Jeger et al.
3,291,836   12/1966   Tadanier et al.

BERNARD HELFIN, *Primary Examiner.*

M. JACOB, *Assistant Examiner.*

UNITED STATES PATENT OFFICE
CERTIFICATE OF CORRECTION

Patent No. 3,394,188            July 23, 1968

John A. Edwards

It is certified that error appears in the above identified patent and that said Letters Patent are hereby corrected as shown below:

Column 3, line 24, "methanoilc" should read -- methanolic --. Column 4, lines 60 and 61, "drofuran or tetrahydropyran, $R^3$=aliphatic hydrocarbon), may be obtained directly." should read -- 3β-ol (VII; $R^2$=hydrogen, $R^5$=tetrahydropyranyl, $R^3$= aliphatic hydrocarbon). --. Column 5, line 72, "VII" should read -- VIII --. Column 6, line 7, "lattre" should read -- latter --. Column 7, line 68, "3β-17β-diol" should read -- 3β,17β-diol --. Column 8, line 23, "3β,17b" should read -- 3β,17β --. Column 12, line 33, after "19-" insert -- nor- --; line 37, "β⁴" should read -- $\Delta^4$ --. Column 14, line 32, "17a" should read -- 17α --.

Signed and sealed this 30th day of December 1969.

(SEAL)
Attest:

Edward M. Fletcher, Jr.          WILLIAM E. SCHUYLER, JR.
Attesting Officer               Commissioner of Patents